(12) United States Patent
Nabuurs

(10) Patent No.: US 6,832,811 B2
(45) Date of Patent: Dec. 21, 2004

(54) OPEN ROOF CONSTRUCTION FOR A VEHICLE

(75) Inventor: Martinus Wilhelmus Maria Nabuurs, Overloon (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/446,636

(22) Filed: May 28, 2003

(65) Prior Publication Data

US 2004/0041443 A1 Mar. 4, 2004

(30) Foreign Application Priority Data

May 29, 2002 (EP) .............................................. 02077745

(51) Int. Cl.[7] .................................................. B60J 7/057
(52) U.S. Cl. .................................. 296/216.08; 296/223
(58) Field of Search ........................ 296/216.06–216.08, 296/223

(56) References Cited

U.S. PATENT DOCUMENTS 4,927,208 A * 5/1990 Farmont ................. 296/216.06
5,156,435 A * 10/1992 Farmont ................. 296/216.06
5,599,059 A    2/1997 Shann .......................... 296/216
6,390,542 B1 * 5/2002 Nabuurs et al. ........ 296/216.07

FOREIGN PATENT DOCUMENTS

| DE | 42 30 406 A | 3/1993 |
| FR | 2 768 197 A | 3/1999 |
| GB | 325 897 A | 3/1930 |

* cited by examiner

Primary Examiner—Dennis H. Pedder
(74) Attorney, Agent, or Firm—Westman, Champlin & Kelly, P.A.; T. Fronek

(57) ABSTRACT

A roof assembly for a vehicle having an opening in its fixed roof includes a frame to be fixed to the roof. The frame is fixed to the vehicle roof by a connection fastener, engaging through a passage opening in said plastic part of the frame and through a hole in the cover plate that is extended beyond the passage opening in the plastic part. The hole in the cover plate is in register with the passage opening in the plastic part. The cover plate is made of metal at least in a projecting part surrounding the hole and is shaped to extend through the passage opening in the frame in order to be engaged by the connection fastener.

20 Claims, 4 Drawing Sheets

US 6,832,811 B2

OPEN ROOF CONSTRUCTION FOR A VEHICLE

BACKGROUND OF THE INVENTION

The invention relates to a roof assembly for a vehicle. More importantly, the present invention relates to mounting the roof assembly in the vehicle.

Roof assemblies for vehicles typically include a frame to be mounted to a fixed roof. The frame can have at least one part that is made of plastic. A separate metal part or insert having a hole is aligned with a hole in the plastic part and used with a nut and bolt fastener to form a rigid connection with the fixed roof. Since the metal part for the nut and bolt connection is a separate loose insert, it is relatively expensive and requires additional assembly operations.

SUMMARY OF THE INVENTION

The object of the present invention is to provide an improved open roof construction of the type referred to in the introduction.

Accordingly, an aspect of the present invention is a roof assembly for a vehicle having an opening in its fixed roof. The roof assembly comprises a frame to be fixed to the roof. The frame has at least one part that is made of plastic and includes a cover plate covering at least a portion thereof. The frame is fixed to the vehicle roof by a connection fastener, engaging through a passage opening in said plastic part of the frame and through a hole in the cover plate that is extended beyond the passage opening in the plastic part. The hole in the cover plate is in register with the passage opening in the plastic part. The cover plate is made of metal at least in a projecting part surrounding the hole and is shaped to extend through the passage opening in the frame in order to be engaged by the connection fastener. According to the invention the metal part of the cover plate serves as the metal part of the connection and therefore there is no need anymore for a loose separate metal insert part, whereas the connection not only mounts the frame to the fixed roof but also provides for a connection between the cover plate and the frame.

The cover plate may be made completely of metal which has local depressions or other projecting parts surrounding the mounting hole, or may be generally made of plastic with one or more integrated metal inserts surrounding the holes and projecting from the cover plate. According to one embodiment the roof assembly includes an adjustable closure element supported by said frame, as well as an operating mechanism for adjusting said closure element, which operating mechanism includes at least one driving cable guided in a cable guides which is covered with said metal cover plate.

BRIEF DESCRIPTION OF THE DRAWINGS

The invention will be explained in more detail hereafter with reference to the drawing where.

DETAILED DESCRIPTION OF THE PREFERRED EMBODIMENTS

Figure 1:
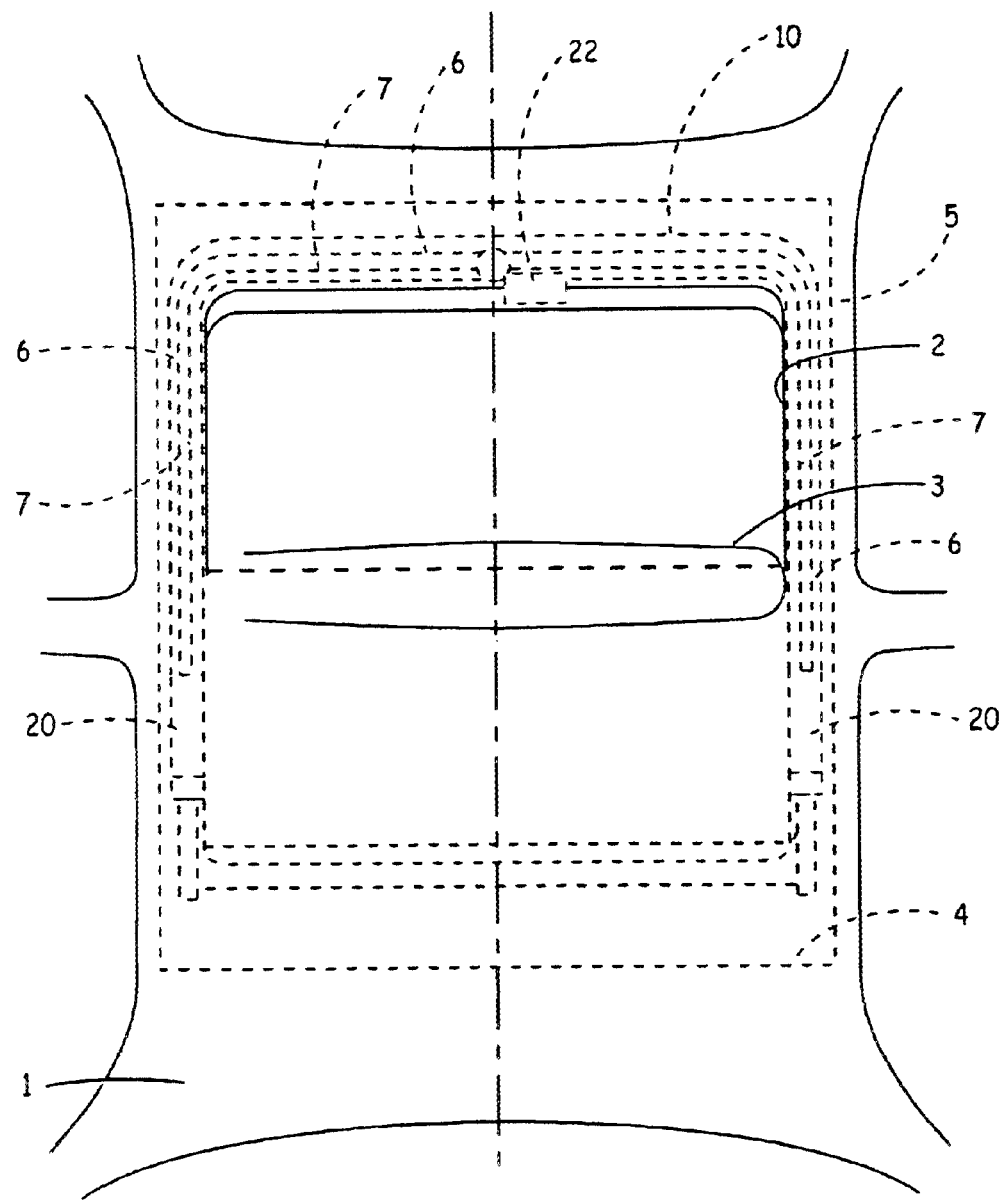
FIG. 1 is a schematic top plan view of a roof assembly.

The drawing shows a fixed roof 1 of a vehicle, such as a passenger car, which is provided with a roof opening 2 for receiving a roof assembly. The roof assembly includes a closure element 3 for selectively closing or at least partially releasing the roof opening 2. The closure element 3 may be a rigid panel, in particular a transparent panel of glass or plastic material, but may also be constructed as slats, a flexible cover or the like.

The closure element 3 is adjustably supported by a stationary part of the roof assembly, in particular a frame 4 for surrounding the roof opening 2 and for attaching the roof assembly to the fixed roof 1 of the vehicle. At least a part 5 of frame 4 is made of plastic material, such as SMC (Sheet Molding Compound) or GRP (Glass fibre Reinforced Plastics).

In order to enable the movements of panel 3, panel 3 is fitted with an operating mechanism 20 at both edges of the roof opening 2 extending in the longitudinal direction of the roof assembly on suitable guide rails as is well known. The adjustment of the operating mechanism 20 is effected by driving means such as an electric motor or a hand crank 22, the rotation of which is converted into a sliding movement and transmitted to the operating mechanisms 20 by driving cables 6, 7. These cables are guided in cable guides 8, 9 which are recessed in the plastic frame part 5 and are covered by a metal cover plate 10.

Figure 3:
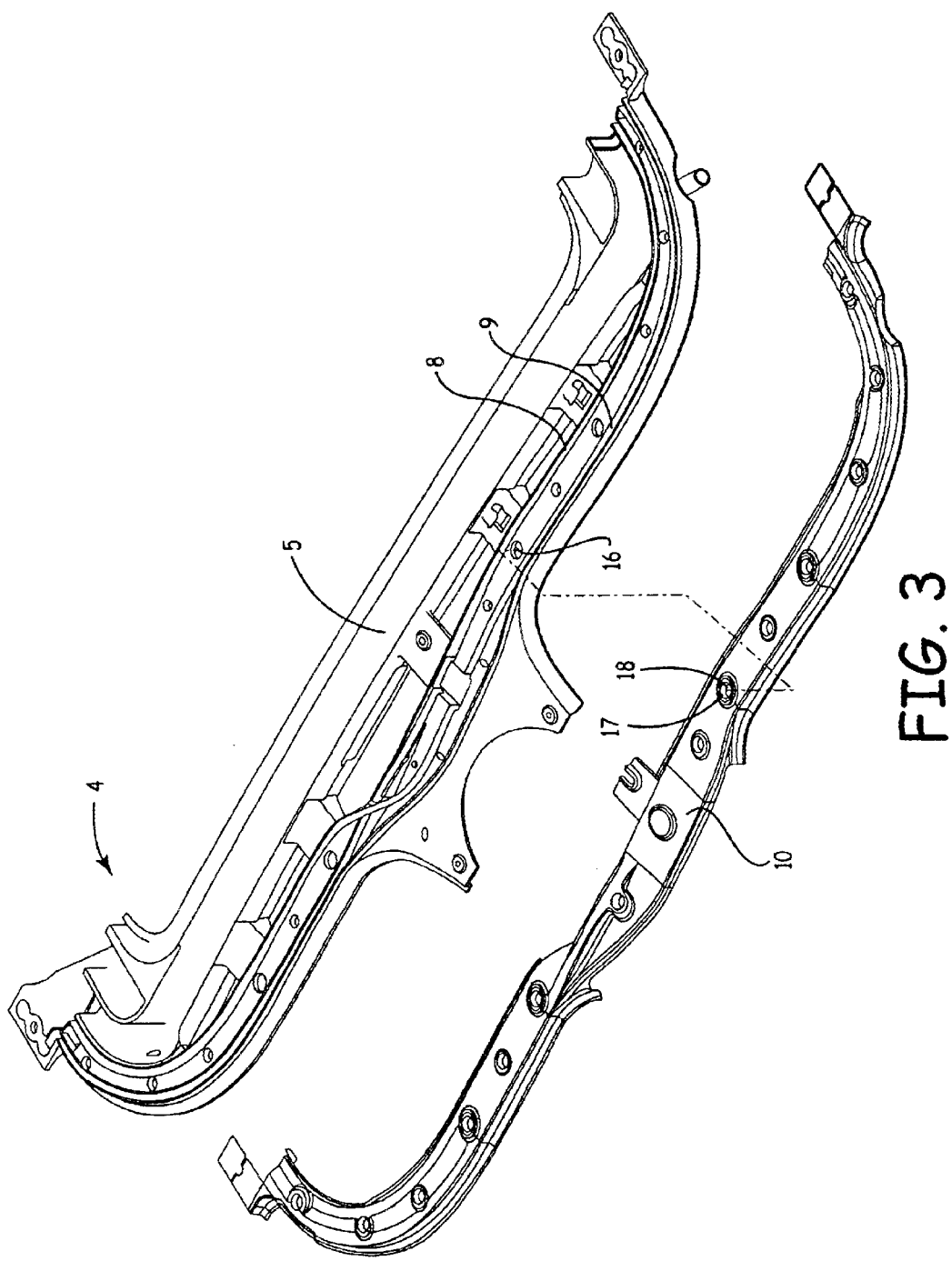
FIG. 3 is an exploded view of some components of a second embodiment of a roof assembly of the present invention.

As illustrated in FIGS. 1 and 3, frame part 5 can be mounted in front of the roof assembly in a forwardmost position on the vehicle. The frame part 5 can include end portions extending longitudinally along the sides of the roof opening 2. However, frame part 5 can be located along any portion about the perimeter of the roof opening 2.

Figure 2:
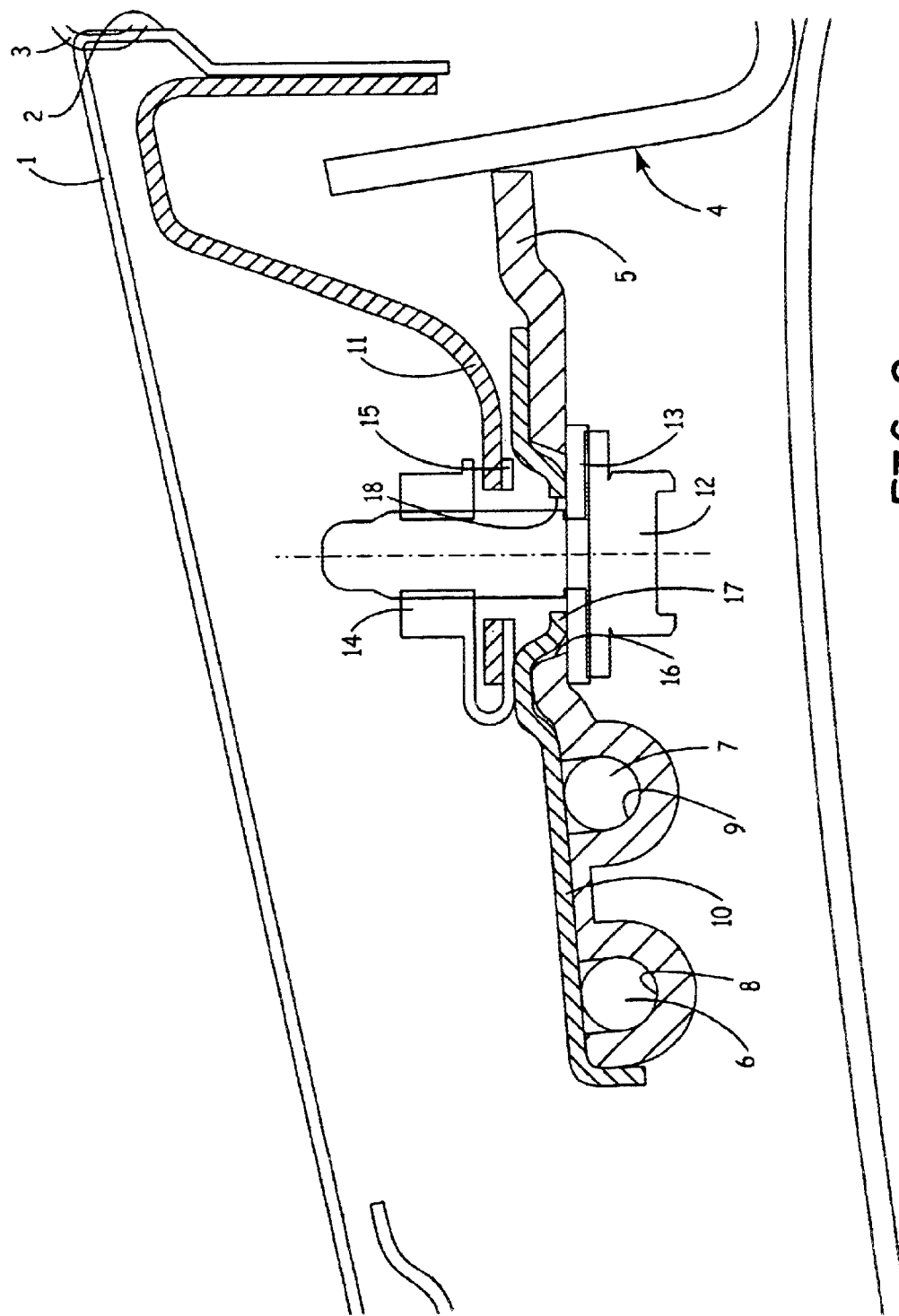
FIG. 2 is a cross sectional view of a part of a first embodiment of the roof assembly according to the invention.

In general, FIG. 2 is a cross section view of a first embodiment, where the drive cables 6 and 7 are disposed on one side of a fastener connection discussed in detail below. Whereas, FIG. 3 is an exploded view of a metal plate cover 10 and frame part 5 with cable guides 8, 9 and corresponding drive cables (not shown) disposed on opposite sides of the fastener connection in a second embodiment. The details pertaining to the fastener connection and metal plate 10 apply to the second embodiment as well, while the general spaced apart nature of the fastener connections illustrated in FIG. 3 apply also to the first embodiment of FIG. 2.

Referring to FIG. 2, the frame 3 of the roof assembly is adapted to be mounted to a reinforcement 11 of the vehicle roof 1, in this exemplary case by means of a bolt and nut fastener connection including a bolt 12 and an underlying washer 13, a nut 14 and an integrated washer 15. The shaft of bolt 12 extends through a passage opening 16 in the frame part 5.

As is shown in the drawing, the passage opening 16 in the frame part 5 is positioned next to the cable guide 9. For reasons of economy, the cover plate 10 for the cable guides 8, 9 is extended at least locally beyond the passage opening 16 in the frame part 5 in order to serve as an anti relaxation means for the bolt and nut connection. For this purpose, it includes a depression 17 having a concentric hole 18 allowing passage of the bolt 12. The depression 17 fits into the passage opening 16 in the frame part 5 and has a height that is substantially equal to the local thickness of the frame part 5 surrounding the passage opening 16. Preferably, in this embodiment, the height of the depression is approximately 0.2 mm smaller than the thickness of the frame part 5 so that the frame part 5 is clamped between the bolt washer 13 and the nut washer 15. Through the depression 17 the cover plate 10 and the frame 4 are tightly fastened to the reinforcement 11 of the fixed roof 1 without a risk of loosening due to the relaxation of the plastic of the frame since the connection is completely formed by metal parts. Then the metal depression 17 is clamped between the washer 15/reinforcement 11 and the washer 13/bolt 12.

It should be noted FIG. 2 shows the components prior to final tightening or in an unclamped state.

In the embodiment illustrated in FIG. 2, there is no direct contact between the bottom of the depression 17 and the washer 15/reinforcement 11. The bolt 12/washer 13 will be pressed against the depression 17, but the washer 15/reinforcement 11 will be pressed against the upper side of the cover plate 10 around the depression 17. In another embodiment, the washer 15/reinforcement 11 can be pressed against the annular raised portion around the depression.

Figure 4:
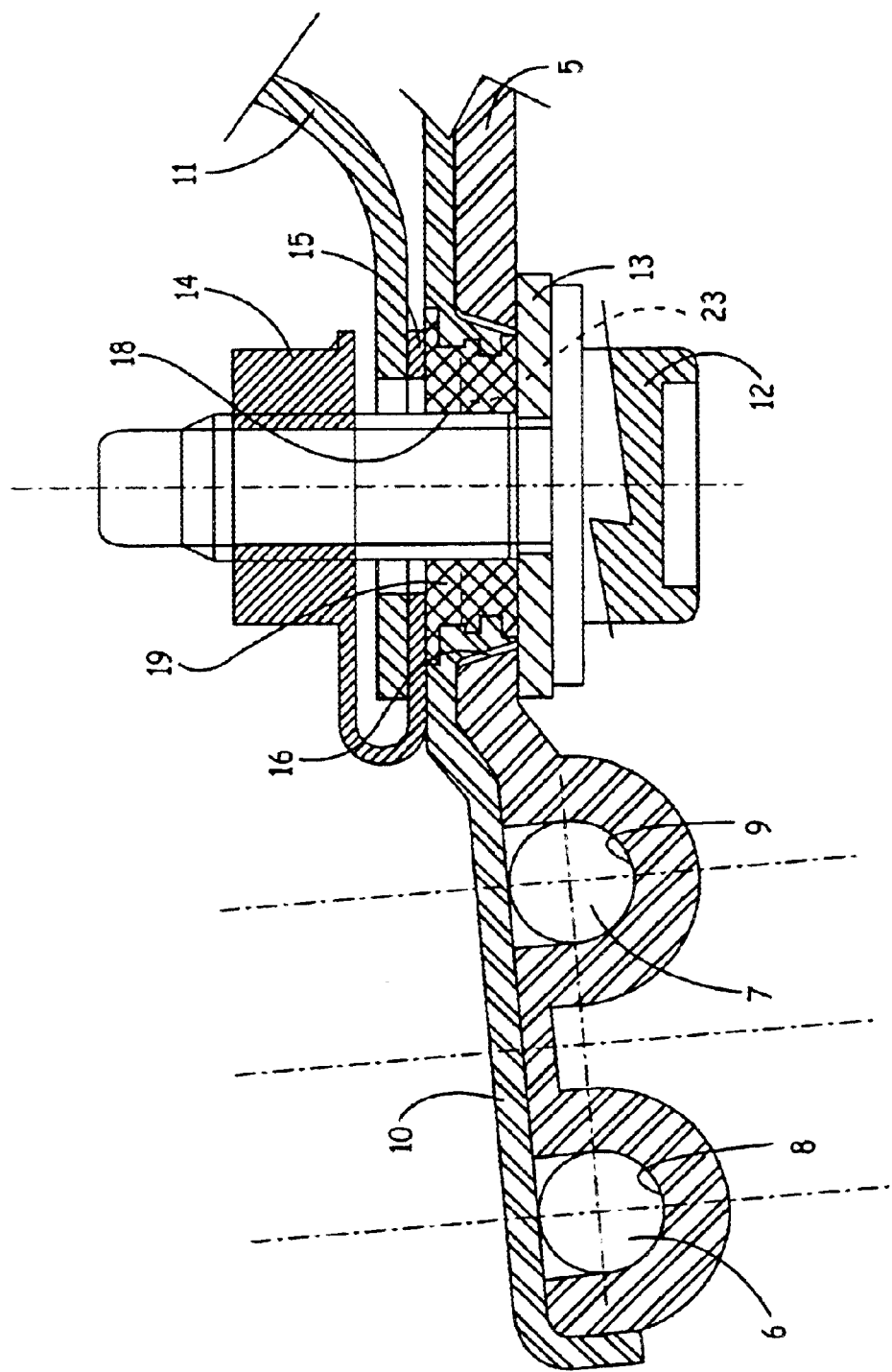
FIG. 4 is a cross sectional view substantially corresponding to that of FIG. 2, but showing a third embodiment of the roof assembly of the present invention.

In the embodiment of FIG. 4, the cover plate is generally made of plastic, and only a part of the cover plate surrounding the hole 18 is made of metal. This metal part is formed by an insert 19, which has a circular circumference. In the illustrated embodiment, a diameter of the insert 19 varies along the axial length (it has ribs at the end and in the middle) in order to provide a form of lateral projections to securely embed it in the surrounding plastic. At the upper side, the metal insert 19 is flush with the upper side of the cover plate 10. However, at the lower side it projects from the main plane of the cover plate 10 in order to be able to extend through the passage opening 16 in the frame part 5. The plastic of the cover plate 10 completely surrounds the insert by an annular portion tapering towards the lower side of the insert 19. In this embodiment, there is direct contact between the upper side of the insert 19 and the washer 15/reinforcement 11. The height of the insert 19 is slightly smaller than the combined thickness of the frame part 5 and the cover plate 10 so that the frame part 5 is clamped between the cover plate 10 and the bolt washer 13, and is thereby tightly fixed to the roof reinforcement 11. Stated another way, metal part 19 has a projecting height 23 which is one of equal to or slightly smaller than the local thickness of the plastic part of the frame 5. The large upper rib of the metal insert 19 in the cover plate 10 further improves the clamping action on the frame part 5. Although illustrated where the top of the insert 19 is flush with adjacent portions of the cover 10, the insert 19 can extend above or even be below the cover plate 10 as long as when engaged by the fastener connection metal contact is made throughout the connection and the frame part 5 is clamped.

As a result of the connection as shown and described, the cover plate 10 is attached to the frame 5 and by the same connection the frame 5 is attached to the fixed roof. Of course it is possible to secure the cover plate 10 to the frame 4 by additional means, e.g. other fasteners.

The invention is not restricted to the above-described embodiment as shown in the drawing, which can be varied in several ways without departing from the scope of the invention. The metal part of the connection may also be formed by another metal part of the frame if present. The cover plate may be extended locally or along the whole length thereof. The bolt and nut may be replaced by other fastening mechanisms that extend through the holes.

Although the present invention has been described with reference to preferred embodiments, workers skilled in the art will recognize that changes may be made in form and detail without departing from the spirit and scope of the invention.

What is claimed is:

1. A roof assembly for a vehicle having an opening in its fixed roof, comprising:
a frame to be fixed to the roof, said frame having at least one part that is made of plastic and includes a cover plate covering at least a portion of said plastic part, said frame being adapted to be fixed to the vehicle roof by a connection fastener, engaging through a passage opening in said plastic part of the frame and through a hole in the cover plate that overlaps the passage opening in the plastic part, where said hole is in register with the passage opening in the plastic part, the cover plate being made of metal at least in a projecting part surrounding the hole which is shaped to extend into the passage opening in the plastic part in order to be engaged by the connection fastener.

2. The roof assembly according to claim 1, which includes an adjustable closure element supported by said frame, as well as an operating mechanism for adjusting said closure element, which operating mechanism includes at least one driving cable guided in a cable guide which is covered with said metal cover plate.

3. The roof assembly according to claim 2, wherein said projecting metal part has a projecting height which is one of equal to and slightly smaller than the local thickness of the plastic part of the frame.

4. The roof assembly according to claim 2, wherein the passage opening in the plastic part is positioned next to the cable guide.

5. The roof assembly according claim 4, wherein the fastener connection includes a nut and bolt.

6. The roof assembly according to claim 1, wherein said projecting metal part has a projecting height which is one of equal to and slightly smaller than the local thickness of the plastic part of the frame.

7. The roof assembly according claim 1, wherein the fastener connection includes a nut and bolt.

8. The roof assembly according to claim 2, wherein the fastener connection includes a nut and bolt.

9. The roof assembly according to claim 3, wherein the fastener connection includes a nut and bolt.

10. The roof assembly according claim 1, wherein the cover plate is made completely out of metal.

11. The roof assembly according claim 10, wherein the projecting part surrounding the hole is formed as a depression.

12. The roof assembly according claim 1, wherein the cover plate is made generally of plastic, and the projecting metal part is formed as an insert in the cover plate.

13. A roof assembly for a vehicle having an opening in its fixed roof, comprising:
a frame to be fixed to the roof, said frame having at least one part that is made of plastic and includes a metal cover plate covering at least a portion of said plastic part, said frame being adapted to be fixed to the vehicle roof by a connection fastener, engaging through a passage opening in said plastic part of the frame and through a hole in the cover plate that overlaps the passage opening in the plastic part, where said hole is in register with the passage opening in the plastic part and is formed through a metal part of the cover plate that projects from the cover plate in order to extend into the passage opening in the plastic part of the frame in order to be engaged by the connection fastener.

14. The roof assembly according claim 1, wherein the cover plate is made completely out of metal.

15. The roof assembly according claim 10, wherein the projecting part surrounding the hole is formed as a depression.

16. The roof assembly according claim 1, wherein the cover plate is made generally of plastic, and the projecting metal part is formed as an insert in the cover plate.

17. The roof assembly according to claim 1, wherein the projecting part engages a washer of the fastener.

18. The roof assembly according to claim 13, wherein said metal part of the cover plate engages a washer of the fastener.

19. The roof assembly according to claim 1, wherein the hole in the cover plate is of a smaller size then the passage opening in the plastic part.

20. The roof assembly according to claim 13, wherein the hole in the cover plate is of a smaller size than the passage opening in the plastic part.

* * * * *